United States Patent [19]

Albonesi

[11] Patent Number: 4,920,539

[45] Date of Patent: Apr. 24, 1990

[54] MEMORY ERROR CORRECTION SYSTEM

[75] Inventor: David Albonesi, Hudson, Mass.

[73] Assignee: Prime Computer, Inc., Natick, Mass.

[21] Appl. No.: 209,285

[22] Filed: Jun. 20, 1988

[51] Int. Cl.$^5$ ............................................. G06F 11/10
[52] U.S. Cl. .................. 371/40.2; 371/29.1; 371/13
[58] Field of Search ............... 371/38, 37, 21, 5, 13, 371/16.5, 40.1, 40.2, 40.3, 40.4, 29.1, 5.1, 21.1, 21.2; 365/200; 364/200, 900

[56] References Cited

U.S. PATENT DOCUMENTS

| | | | |
|---|---|---|---|
| 4,621,364 | 11/1986 | Tshoepe | 371/13 |
| 4,646,304 | 2/1987 | Fossati | 371/13 |
| 4,710,934 | 12/1987 | Traynor | 371/38 |
| 4,791,642 | 12/1988 | Taylor | 371/13 |
| 4,794,597 | 12/1988 | Ooba | 371/13 |
| 4,800,563 | 1/1989 | Itagati | 371/13 |

Primary Examiner—Michael R. Fleming
Attorney, Agent, or Firm—Wolf, Greenfield & Sacks

[57] ABSTRACT

A system for correcting soft memory failures such as alpha particle failures in a dynamic random access memory and in a computer system wherein writeback caches are employed in a system bus environment. The address field and source identification code associated with a detected data error are stored. A generic bus request signal is generated and upon a bus grant a read message is issued on the system bus having an address field and destination address code corresponding to the stored address field and source identification code. In response to the read message, the device indicated by the identification code writes back to memory the correct data corresponding to the address field.

42 Claims, 2 Drawing Sheets

MEMORY ERROR CORRECTION SYSTEM

BACKGROUND OF THE INVENTION

1. Field of the Invention

The present invention relates in general to a memory error correction technique, and pertains, more particularly, to a technique for correcting correctable errors by recycling data that has been corrected by the memory error correction logic back into memory in order to clean up memory errors and, in particular, alpha particle (soft) failures.

2. Background Discussion

When a correctable error (CE) occurs in a memory, and, in particular, in association with dynamic random access memories (DRAMs), it is desirable to send the corrected data back into the memory to correct the failure, so that the probability of an uncorrectable error (UE) occurring is reduced. This involves the correcting of the correctable error by the error correcting code hardware, and, in addition, providing the corrected copy to the requesting processor and writing the corrected data back into the memory location from which it was read. This serves the purpose of "cleaning up" the error if it was a soft (alpha particle) error.

In one previous system, the memory controller accomplished this by placing the corrected data into a reserved location in the write buffer and setting the write pending bit. This causes the memory controller to treat this location in the write buffer as data that is to be written back into the memory DRAMs.

Present, larger capacity memory systems are different from previous memory systems in that while previous memories performed read or write on a maximum of 64 bits (78 bits including the error correcting code), present memory systems deal with as many as eight times this much information (eight double words or 512 bits or, alternatively, 576 bits with the error correcting code). Thus, due to this increased hardware requirement, the present storage control unit does not contain a write buffer in the traditional sense. Only addresses are buffered at the storage control unit and there is no provision for buffering groups of 576 bits. Rather, data is "staged" in a fetch pipeline. A "fetch pipeline" is a logic arrangement that holds data in a fetch data path while waiting for the system bus.

Because of the short cycle time of modern machines, and because of the many functions that need to be performed in the memory subsystem on fetch data, a fetch pipeline which operates like a CPU pipeline is implemented in order to hold the eight double words of fetch data on a read operation while the storage control unit is waiting to be granted use of the system bus (SYS-BUS). Clearly, with this type of architecture, the previous method of recycling data employing a write buffer on a correctable error is not usable.

Accordingly, it is an object of the present invention to provide an improved system for memory error correction and, in particular, for correction of alpha particle type (soft) memory failures.

Another object of the present invention is to provide a memory error correction system for use in a system wherein the various processors employ writeback caches.

SUMMARY OF THE INVENTION

To accomplish the foregoing and other objects, features and advantages of the invention there is provided an improved technique for correcting memory errors and, in particular, correctable types of errors such as alpha particle (soft) memory errors or failures. The concepts of the present invention are preferably employed in a memory controller system not having a write buffer but wherein there are preferably provided writeback caches in a system bus environment. The writeback caches in this type of system are able to respond to read requests from other devices. Therefore, while the data was recycled entirely within the memory subsystem previously through the use of the write buffer, the solution of the present invention takes advantage of the capability of writeback caches in the system to respond to read requests. Thus, the memory controller functions like other devices on the system bus, requesting data to be sent back to it by making a read request whenever a correctable error occurs. Hence, the technique of the present invention is more of a system solution to the recycling problem and is geared preferably toward systems with writeback caches. On the other hand, the write buffer technique is a memory-only solution.

In accordance with the system of the present invention, there is a storage control unit for controlling the transfer of data from a system bus to an array control unit and associated memory array. If a correctable error is detected by the storage control unit, while data is being transferred out onto the system bus, the fetch sequencer of the storage control unit causes a generic message request signal to be encoded on the bus request lines to the bus control unit, and on a prioritized basis, a bus grant occurs and the storage control unit renders a read CE (correctible error) message out onto the system bus. The generic message request represents a group of miscellaneous requests such as invalidation, sending machine check modes, and read CE requests. The storage control unit makes the destination ID and the address fields of this message to be identical to the source ID and address fields of the read message upon which the CE occurred. This special read message is different from other read messages in that it is device specific; that is, only the device whose device ID matches the destination ID responds to the read request. Thus, when the device which just received the read data on which the CE occurred sees this message on the system bus, it performs a writeback of a block of data back to the memory subsystem over the system bus, cleaning up the soft error in memory.

In accordance with a further aspect of the present invention, there is also disclosed herein an improved method of correcting memory errors, which method is practiced in a computer system having a central processing unit, I/O processing unit, a memory, a memory control unit, a systems communication bus and a bus control unit. This method comprises the steps of detecting a data error while data is being transferred from memory to the system bus and storing at the memory control unit at least the address field and source identification code associated with the just detected data error. A next step is the generating of a bus request signal coupled to the bus control unit. The bus control unit, in turn, generates a bus grant signal on a prioritized basis. The memory control unit in response to the bus grant signal issues a read CE message on the system bus having an address field and destination identification code corresponding to the stored address field and source identification code. In response to the read CE message, the device indicated by the identification code writes back to memory the correct data corresponding to the address field.

BRIEF DESCRIPTION OF THE DRAWINGS

Numerous other objects, features and advantages of the invention should now become apparent upon a reading of the following detailed description taken in conjunction with the accompanying drawings, in which.

DETAILED DESCRIPTION

Figure 1:
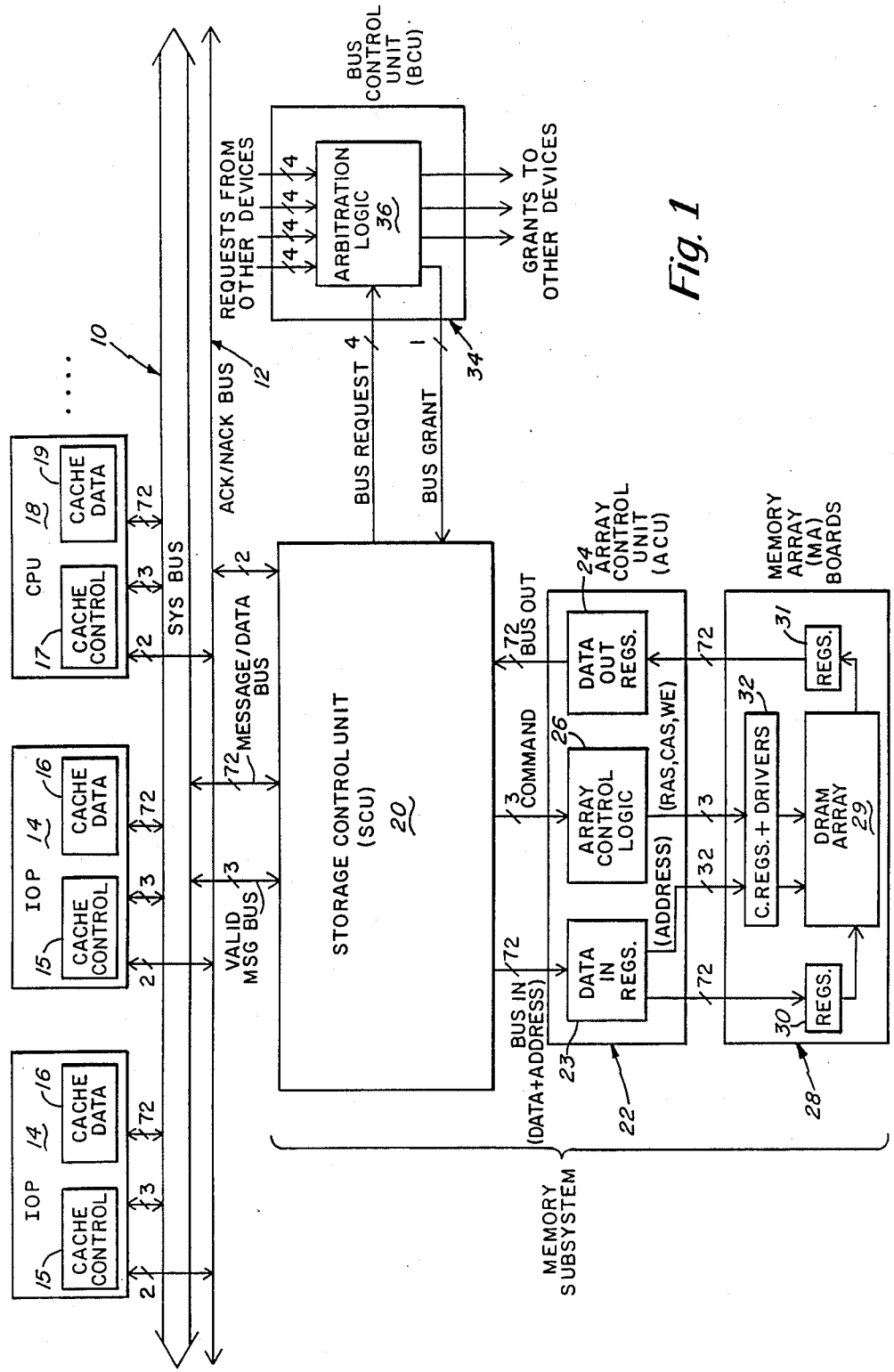
FIG. 1 is a general block diagram of a memory system as in accordance with the present invention.

In connection with a further description of the concepts of the present invention, reference may be now made to the general block diagram of FIG. 1 for an illustration of the basic components comprising the memory error correction system. FIG. 1 illustrates the system bus 10 and associated acknowledgment bus 12, also referred to hereinafter as the ACK/NACK bus 12. FIG. 1 also illustrates the various processors and subsystems that interface with the system bus 10 and bus 12. For the purpose of illustration in FIG. 1, there are shown the I/O processors 14 and CPU (central processing unit) 18. FIG. 1 also illustrates the storage control unit 20 that intercouples between the system bus 10 and the array control unit 22 and a memory array 28. Finally, FIG. 1 also discloses the bus control unit 34.

In the block diagram of FIG. 1, many of the components and associated operations thereof are conventional and they are thus not described in any great detail. For example, the bus control unit 34 may be substantially of conventional design including prioritizing arbitration logic 36. Also, the array control unit 22 may be considered as being of substantially conventional design including data input registers 23, data output registers 24 and array control logic 26. The array control logic 26 generates such well known memory control signals as the signals RAS, CAS and WE. Likewise, the memory array 28 includes a dynamic random access memory array 29 with associated data registers 30 and 31, register 30 being an input data register and register 31 being an output data register. Within the memory array 28, there is also disclosed the box 32. This may be comprised of a series of registers and drivers for control and addressing of the array 29.

At the processor end of the system, as indicated previously, there is illustrated in FIG. 1 two I/O processors 14 and CPU 18. Each of these processors has a cache memory which is a writeback cache. As far as the I/O processors are concerned, this is illustrated in FIG. 1 by the cache control 15 and cache data 16. Similarly, the CPU 18 has a writeback cache illustrated by the cache control 17 and cache data 19. As far as the storage control unit 20 is concerned, reference is made hereinafter to the more detailed block diagram of FIG. 2 for further details of the storage control unit. It is the storage control unit 20 that is primarily designed for use of the concepts of the present invention, particularly as it interrelates with the bus control unit 34.

The system bus 10 in the embodiment described is a 72 bit multiplexed message and data bus and also includes as part thereof a three bit valid message bus. The valid message bus serves to qualify whether a message, data or nothing is on the 72 bit bus at any given bus cycle. In addition, there is illustrated the two bit ACK-/NACK bus 12. This is used to inform the sender of a system bus message whether or not the required action has been performed in response to the message or not. In actual implementation, this bus may be 4 bits wide but is shown herein in its simplified form for the purpose of clarifying the description.

The bus control unit 34 controls the usage of the system bus 10. In this regard, and as illustrated in FIG. 1, the arbitration logic 36 of the bus control unit 34 receives four bit bus requests from each device which attaches to the system bus and provides a single bit bus grant line to the device with the highest priority bus request. In this regard, in FIG. 1, note the 4 bit inputs from devices and the single bit outputs indicating a bus grant. Also note that a bus request is coupled from the storage control unit 20 and likewise a single bit bus grant line couples back to the storage control unit from the arbitration logic 36.

As indicated previously, the memory subsystem is basically comprised of a storage control unit 20, an array control unit 22, and the memory array 28. The memory array 28 contains the dynamic RAM chips used for storage as well as registers and drivers. The array control unit 22 generates the array control signals previously referred to RAS, CAS, WE needed to read, write and refresh the DRAM array 29. The array control unit 22 also registers the fetch and stored data between the storage control unit 20 and the memory array 28.

Figure 2:
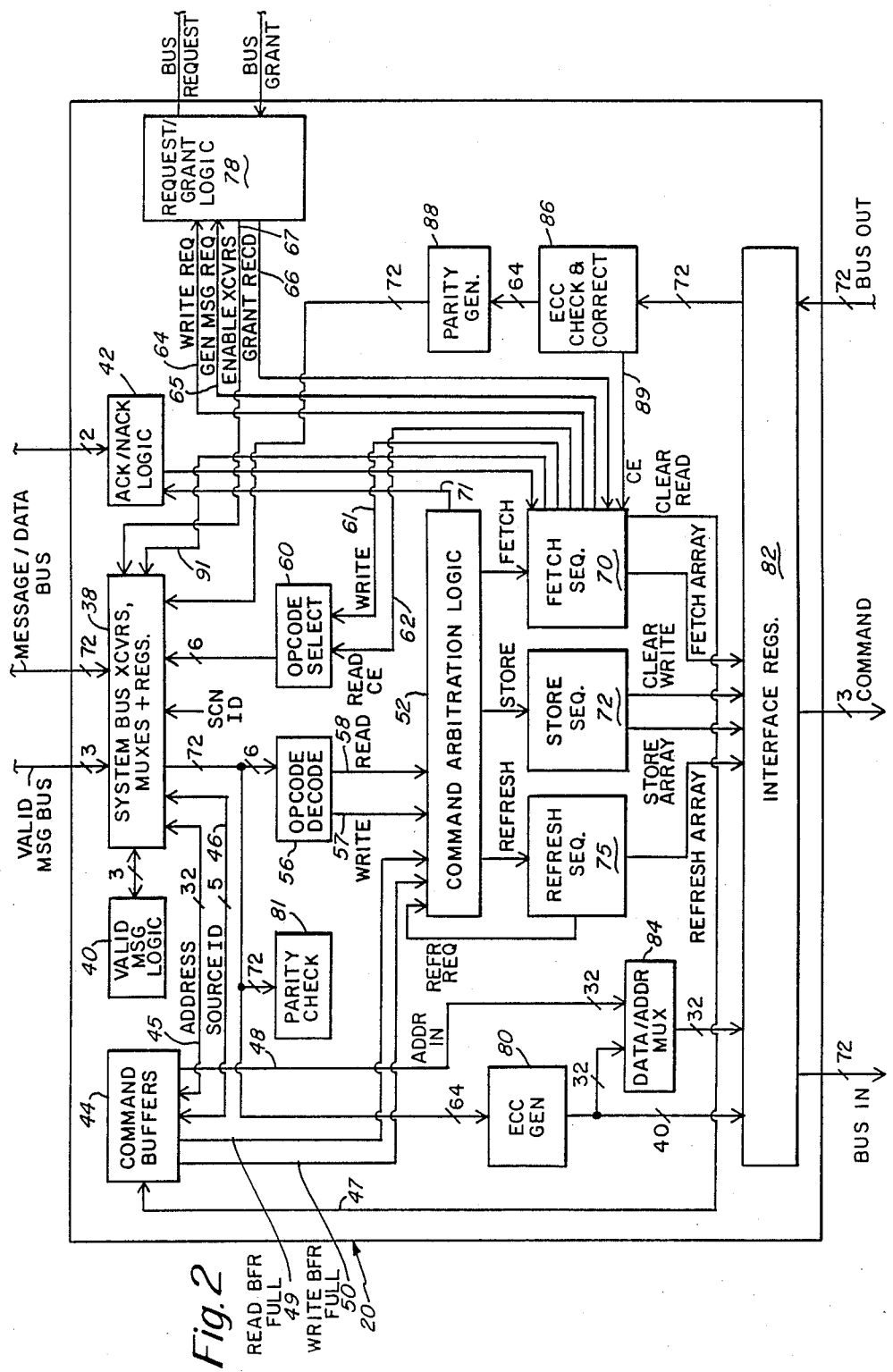
FIG. 2 describes the further details of the storage control unit of FIG. 1.

Now, reference is made to the more detailed block diagram of the storage control unit 20 as illustrated in FIG. 2. The storage control unit 20 includes a transceiver box 38 which is the basic element interfacing directly with the system bus 10. In this regard, note the direct connection at the 72 bit message/data bus and 3 bit valid message bus. The system bus transceivers 38 include also multiplexers and registers. The box 38 contains bidirectional transceivers, input and output registers and multiplexers for messages and data sent by the storage control unit 20 onto the system bus 10.

There is also described the valid message logic 40 shown having a three bit line connecting with the system bus transceivers 38. The valid message logic 40 decodes the valid message bus when the storage control unit 20 is not using the system bus, it also creates the proper code for messages and data sent by the storage control unit 20 onto the system bus 10.

The logic box 42 is appropriately referred to as the ACK/NACK logic and performs a similar function to that of the valid message logic 40, but for the ACK-/NACK bus 12. The logic 42 decodes the ACK-/NACK bus 12 when the storage control unit 20 is expecting a response to a message which it generates and it creates the proper code for the storage control unit 20 in its response to messages which it receives off of the system bus 10.

Within the details of the storage control unit 20, there is also illustrated the command buffer 44 which is actually comprised of a plurality of buffers. The command buffer 44 holds the address and source ID of the read message which the storage control unit 20 is currently servicing. In this regard, there are several lines coupling into and out of the command buffer 44. A 32 bit address line 45 intercouples between the transceivers 38 and the command buffer 44. The transceivers 38 may be comprised of registers operating in combination with multiplexers for communicating address and fetch data with the system bus.

Also, there is a 5 bit source ID line 46 similarly coupling. There is a "clear" line 47 and there is a 32 bit address line 48. Two control lines couple from the command buffer 44. These are the read buffer full signal on line 49 and the write buffer full signal on line 50. The read buffer full signal and the write buffer full signal indicate that the storage control unit is servicing a read or a write message, respectively. The signal on lines 49 and 50 is coupled to the command arbitration logic 52.

In the details of the storage control unit 20, the results are provided to OPCODE control. This includes the OPCODE decode block 56. This logic block decodes the OPCODE field of the system bus messages into valid read and write commands. As noted in the detailed drawing, there is a 6 bit input to the OPCODE decode block 56 and there are at lines 57 and 58 corresponding write and read signal lines.

There is also provided the OPCODE select logic 60. This logic encodes the write or read CE signals into their corresponding OPCODE code. The OPCODE select logic 60 receives these signals from the fetch sequencer 70. In this regard, note in the detailed logic the write line 61 and the read CE line 62.

The command arbitration logic 52 arbitrates between the read and write commands directly from the system bus, read and write commands stored in the command buffer 44, which could not be executed immediately when received off the system bus because of some other command being executed by the storage control unit, and refresh requests generated by the refresh sequencer 75.

Also associated with the command arbitration logic 52 is a store sequencer 72. The command arbitration logic 52 provides either a refresh, store, or fetch command to the proper sequencer. This is illustrated in the detail block diagram by the "refresh" line coupling to the refresh sequencer 75, the "store" line coupling to the store sequencer 72 and the "fetch" line coupling to the fetch sequencer 70. In addition, when the read (write) buffer full line is active and a read (write) command is received off of the system bus, the command arbitration logic 52 activates the NACK signal to the ACK/NACK logic 42. This is illustrated in the detailed block diagram by the line 71.

The sequencers 70, 72 and 75 provide the necessary control signals needed to carry out fetch, store and refresh commands, respectively. For example, the fetch sequencer 70 generates control signals to the array control unit 22 for a "fetch" operation, controls the selection of the proper OPCODE, controls multiplexing of messages and data onto the system bus, controls the requesting of the use of the system bus, and clears the read buffer part of the command buffer when it is ready to receive the next read command, among other tasks. This is the aforementioned read clear line 47 coupling from the fetch sequencer 70 to the command buffer 44.

Associated with the fetch sequencer 70 is the request/grant logic 78. The logic 78 provides the interface between the storage control unit 20 and the bus control unit 34. The request/grant logic 78 creates the proper bus request code for write and generic message requests from the fetch sequencer 70, and when a bus grant is received, the logic 78 output enables the system bus transceivers 38 and informs the fetch sequencer 70 to continue sequencing. On the bus control unit side, there is the 4 bit bus request line coupling from the logic 78 to the arbitration logic 36. The single bit bus grant line couples from the logic 36 back to the request/grant logic 78. On the other side of the logic block 78 are the input signals thereto which include the write request signal on line 64 and the generic message request signal on line 65. The output lines from the logic 78 include the grant received signal on line 66 and the enable transceivers signal on line 67. Lines 64 and 65 couple from the fetch sequencer 70. The grant received signal on line 66 couples to the fetch sequencer 70 while the transceiver enable signal on line 67 couples back to the system bus transceivers 38.

The input data coupled by way of the system bus transceivers 38, which is 64 bits of data, couples to the ECC (error correcting code) generator 80. The output of the generator 80 couples to both the interface registers 82 as well as the data/address multiplexer 84. The ECC generator 80 provides a proper ECC (8 bits) code for the 64 bits of data being stored in the memory. The data/address multiplexer 84 multiplexes addresses from the read buffer portion of the command buffer 44 with addresses and data from the system bus 10. This is for the system bus fetch commands which are delayed by the storage control unit because it is busy executing some other command. Also associated with the ECC generator 80 is a parity check box 81.

On the data output end of the system, it is noted that the interface registers 82 couple to the ECC check and correct box 86 which in turn couples by way of the parity generator 88 to the system bus transceivers 38. The ECC check and correct logic checks for ECC errors and corrects them, if possible, when data is being put out onto the system bus by the storage control unit 20.

There has now been described hereinbefore, the basic components comprising the storage control unit 20. Now, consideration is given to a sequence of operation usable in carrying out the concepts of the present invention. During a memory fetch operation, when data has been accessed out of the memory array 29, and is being clocked through the fetch data path, the fetch sequencer 70 causes a write request to be sent to the bus control unit 34 by activating the write request line 64 to the request/grant logic 78. In this regard, the basic fetch data path is from the array 29 by way of registers 31 and 24 to the interface registers 82, and through boxes 86 and 88 to the transceivers 38 and from there to the system bus 10.

If the bus grant signal, from the arbitration logic 36 is received by the storage control unit 20 immediately, the data continues, nonstop, through the rest of the fetch data path and onto the system bus. This data is immediately preceded by a write message with the command buffer address and source ID signals inserted into the address and designation ID fields of the write message. The fetch sequencer 70 activates the multiplex control line 91 that couples up to the transceivers 38, in order to enable the write message with the command buffer address and source ID onto the system bus. The fetch sequencer 70 also deactivates this signal on line 91 for the following eight cycles to enable the fetch data onto the system bus. In this regard note the address and source ID lines intercoupling between the command buffer 44 and the transceivers 38. If, however, the bus grant signal is delayed, because some other device was granted use of the system bus first, then the fetch sequencer loops in a "hold" state, holding the data in the fetch data path until the bus grant signal is received.

When fetch data is being transferred out onto the system bus 10, it is checked for the correct ECC by the ECC check and correct logic 86. If there is no ECC error, then when the last double word is passed onto the system bus 10, the fetch sequencer 70 clears the read buffer full signal in the command buffer 44 by activating the "clear read" signal, namely, line 47 and the command buffer is therefore ready to accept the next read command from the system bus. If, however, a correctable error (CE) occurs while data is being passed onto the system bus 10, the ECC check and correct logic 86 activates the CE line 89 to the fetch sequencer 70 while the data transfer continues. The fetch sequencer 70 does not clear the read buffer full signal at line 49, but rather activates the generic message request line, which is line 65 to the request/grant logic 78. This logic, in turn, encodes the bus request lines with a generic message request to the bus control unit 34. The fetch sequencer 70 also activates the read CE line 62 to the OPCODE select logic 60, and selects the command buffer address and source ID fields to be the address and destination ID fields of the pending read CE message. When the bus grant signal is received, this information is placed onto the system bus. The cache unit which has just received the corrected data from the storage control unit 20 responds to this message by performing a writeback of the corrected data to the memory subsystem. In this way, if the CE was caused by a soft error in memory, then the error is written over with the corrected data. If the cache unit which receives the read CE message is busy servicing some other system bus request, then it will not acknowledge the message. The fetch sequencer 70 will then repeat the process of requesting the bus, receiving the grant, and putting out the read CE message until it receives no NACK signal. Only then is the read buffer full signal cleared and the fetch sequencer is ready to receive another read command from the system bus.

As indicated previously, the read message that is generated from the memory controller has an address field and destination ID corresponding to the stored address field and source identification code. This is the information transferred from the command buffer 44 to the transceivers 38. In accordance with the preferred embodiment of the present invention this is a special type of read message instead of a normal broadcast read message. This is because in accordance with the system bus protocol, shared data comes from the memory subsystem, regardless of whether or not one or more caches has the requested block. In addition, the storage control unit usually only contains a single read buffer location. When this single read buffer location is full, the storage control unit will not acknowledge any other read messages which appear on the system bus that it should be servicing. Therefore, if the block on which the CE occured was marked as shared, and a normal broadcast read message was used to request the writing of the block back to memory, then the storage control unit would end up not acknowledging its own message since it does not clear the read buffer location until the data has been recycled. Even if the storage control unit contained more than one read buffer, this deadlock situation could still occur if all of the read buffers of the storage control unit are full when the CE occurred. If the protocol instead is such that shared data was returned from another cache, if it possessed a copy of the block, then a normal broadcast read could be used to recycle data, as long as it could be guaranteed that the read message would be received by the cache before it would have a chance to replace it with another block.

In such an embodiment of the invention then a normal read can be used without requiring source identification.

Having now described a limited number of embodiments of the present invention, it should now be apparent to those skilled in the art that numerous other embodiments and modifications thereof are contemplated as falling within the scope of the present invention as defined by the appended claims.

What is claimed is:

1. In a computer system having a processing unit, memory, memory control unit, system communication bus, and bus control unit, a method of correcting memory errors, comprising the steps of, detecting a data error while data is being transferred from memory to the system bus and generating corresponding corrected data if a data error is detected, storing at the memory control unit at least the address field and source identification code associated with the just detected data error, generating a bus request signal coupled to the bus control unit, said bus control unit, in turn, generating a bus grant signal, said memory control unit in response to said bus grant signal issuing a read message on the system bus having an address field and destination identification code corresponding to said stored address field and source identification code, and in response to said read message, the device indicated by said identification code, writing back to memory the correct data corresponding to said address field.

2. A method as set forth claim 1 wherein said bus grant signal is generated on a prioritized basis.

3. A method as set forth in claim 1 wherein the step of detecting a data error and generating corresponding corrected data includes generating an error correcting code when data is written to memory and checking the data read from memory for an error.

4. A method as set forth in claim 3 further including correcting the data read from memory.

5. A method as set forth in claim 4 wherein the detected error is a soft memory failure.

6. A method as set forth in claim 5 wherein the error is a correctable error adapted to be corrected before it becomes uncorrectable.

7. A method as set forth in claim 1 wherein the step of writing back to memory to correct the data includes providing a writeback cache responsive to a read request.

8. A method as set forth in claim 1 further including correcting the data read from memory.

9. A method as set forth in claim 1 wherein the detected error is a soft memory failure.

10. A method as set forth in claim 1 wherein the error is a correctable error adapted to be corrected before it becomes uncorrectable.

11. A memory error correction system for use in a computer apparatus having a plurality of processors, a system bus operatively connected to the plurality of processors, a memory susceptible to having soft memory failures, and memory controller means operatively connected to the memory, said system comprising, means for detecting a data error while data is being transferred from memory to the system bus and for correcting that transferred data if a data error is detected, means for storing at least the address field and source identification code associated with the just detected data error, means responsive to data error detection for generating a generic bus request signal, means responsive to said bus request signal for providing a bus grant signal, means responsive to the bus grant signal for issuing a read message on the system bus having an address field and destination identification code corresponding to said stored address field and source identification code, and means responsive to said read message for writing back to memory the correct data corresponding to said address field.

12. A system as set forth in claim 11 wherein said means for detecting a data error and for correcting that data includes error check logic.

13. A system as set forth in claim 12 wherein said means for storing includes data storage register means and command buffer means.

14. A system as set forth in claim 13 wherein the means responsive to data error detection for generating a generic bus request includes a fetch sequencer responsive to the data error and a request/grant logic means.

15. A system as set forth in claim 14 including a bus control unit having arbitration logic means intercoupled with said request/grant logic means to provide the bus grant signal on a prioritized basis.

16. A system as defined in claim 15 wherein said fetch sequence initiates said read message and further including OPCODE select means.

17. A system as defined in claim 16 wherein said means for issuing a read message includes transceiver means, said fetch sequencer selecting the command buffer address and source ID fields to be the destination ID and address fields of the pending read message.

18. A system as defined in claim 11 wherein each processor includes a writeback memory defining the means for writing back to memory.

19. A system as defined in claim 18 wherein each writeback memory comprises a writeback cache.

20. A system as defined in claim 11 wherein said means for detecting a data error and for correcting that transferred data comprises error correcting code check and correct logic.

21. In a computer system having a processing unit, memory, memory control unit, a system communication bus, and bus control unit, a method of correcting memory errors, comprising the steps of, detecting a data error while data is being transferred from memory to the system bus and generating corresponding corrected data if a data error is detected, storing at the memory control unit at least the address field associated with the just detected data error, generating a bus request signal coupled to the bus control unit, said bus control unit, in turn, generating a bus grant signal, said memory control unit in response to said bus grant signal issuing a read message on the system bus having an address field corresponding to said stored address field, and in response to said read message, writing back to memory the correct data corresponding to said address field.

22. A method as set forth in claim 21 wherein said bus grant signal is generated on a prioritized basis.

23. A method as set forth in claim 21 wherein the step of detecting a data error includes generating an error correcting code when data is written to memory and checking the data read from memory for an error.

24. A method as set forth in claim 23 further including correcting the data read from memory.

25. A method as set forth in claim 24 wherein the detected error is a soft memory failure.

26. A method as set forth in claim 25 wherein the error is a correctable error adapted to be corrected before it becomes uncorrectable.

27. A method as set forth in claim 21 wherein the step of writing back to memory to correct the data includes providing a writeback cache responsive to a read request.

28. A method as set forth in claim 21 further including correcting the data read from memory.

29. A method as set forth in claim 21 wherein the detected error is a soft memory failure.

30. A method as set forth in claim 21 wherein the error is a correctable error adapted to be corrected before it becomes uncorrectable.

31. A memory error correction system for use in a computer apparatus having a plurality of processors, a system bus operatively connected to the plurality of processors, a memory susceptible to having soft memory failures, and memory controller means operatively connected to the memory, said system comprising, means for detecting a data error while data is being transferred from memory to the system bus and for correcting that data if a data error is detected, means for storing at least the address field associated with the just detected data error, means responsive to the data error detection for generating a generic bus request signal, means responsive to said bus request signal for providing a bus grant signal, means responsive to the bus grant signal for issuing a read message on the system bus having an address field corresponding to said stored address field, and means responsive to said read message for writing back to memory the correct data corresponding to said address field.

32. A system as set forth in claim 31 wherein said means for detecting a data error and for correcting that transferred data includes error check logic.

33. A system as set forth in claim 32 wherein said means for storing includes data storage register means and command buffer means.

34. A system as set forth in claim 33 wherein the means responsive to data error detection for generating a generic bus request includes a fetch sequencer responsive to the data error and a request/grant logic means.

35. A system as set forth in claim 34 including a bus control unit having arbitration logic means intercoupled with said request/grant logic means to provide the bus grant signal on a prioritized basis.

36. A system as defined in claim 35 wherein said fetch sequence initiates said read message and further including OPCODE select means.

37. A system as defined in claim 36 wherein said means for issuing a read message includes transceiver means, said fetch sequencer selecting the command buffer address field to be the destination address field of the pending read message.

38. A system as defined in claim 31 wherein each processor includes a writeback memory defining the means for writing back to memory.

39. A system as defined in claim 38 wherein each writeback memory comprises a writeback cache.

40. A system as defined in claim 31 wherein said means for detecting a data error and for correcting that transferred data comprises error correcting code check and correct logic.

41. A method of correcting memory errors, comprising the steps of, detecting a data error while data is being transferred from memory and generating corresponding corrected data if a data error is detected, storing at least the address field and source identification code associated with the just detected data error, generating a bus request signal, generating a bus grant signal in response to the bus request signal, issuing a read message in response to the bus grant signal on the system bus having an address field and destination identification code corresponding to said stored address field and source identification code, and in response to said read message, a device indicated by said identification code, writing in the memory the correct data corresponding to said address field.

42. A method of correcting memory errors, comprising the steps of, detecting a data error in data stored in memory and generating corresponding corrected data if a data error is detected, storing at least the address field associated with the just detected data error, generating a bus request signal, generating a bus grant signal in response to the bus request signal, issuing a read message in response to the bus grant signal on the system bus having an address field corresponding to said stored address field, and in response to said read message, writing in the memory the correct data corresponding to said address field.

* * * * *